United States Patent
Watanabe et al.

(10) Patent No.: US 7,386,576 B2
(45) Date of Patent: Jun. 10, 2008

(54) DATA FILE STORAGE DEVICE WITH AUTOMATIC FILENAME CREATION FUNCTION, DATA FILE STORAGE PROGRAM AND DATA FILE STORAGE METHOD

(75) Inventors: Akira Watanabe, Hanno (JP); Masahiro Shindo, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 633 days.

(21) Appl. No.: 10/745,026

(22) Filed: Dec. 23, 2003

(65) Prior Publication Data

US 2004/0148453 A1 Jul. 29, 2004

(30) Foreign Application Priority Data

Dec. 25, 2002 (JP) ............................. 2002-374737
Nov. 28, 2003 (JP) ............................. 2003-398265

(51) Int. Cl.
*G06F 17/30* (2006.01)
(52) U.S. Cl. ................................. 707/201
(58) Field of Classification Search ............... None
See application file for complete search history.

(56) References Cited

U.S. PATENT DOCUMENTS

2002/0156855 A1* 10/2002 Ueno ..................... 709/206
2003/0165160 A1* 9/2003 Minami et al. ............. 370/466

FOREIGN PATENT DOCUMENTS

| JP | 08-110911 | 4/1996 |
| JP | 11-136608 | 5/1999 |
| JP | 2000-035908 | 2/2000 |
| JP | 2001-043240 | 2/2001 |
| JP | 2001-243199 | 9/2001 |

* cited by examiner

*Primary Examiner*—Diane Mizrahi
(74) *Attorney, Agent, or Firm*—Hogan & Hartson LLP

(57) ABSTRACT

A portable device includes a data file storage device, a camera section with an image pickup function and a schedule management section that manages a user's schedule. The data file storage device includes a picture file storage region for storing picture files and a schedule storage region for storing schedule data. When storing a picture file of a picture picked up by the camera section in the picture file storage region, schedule data that matches the file creation date and time of the picture file is searched among the entire schedule data stored in advance in the schedule storage region. When there is schedule data that matches the file creation date and time, schedule character data that represents the content of the schedule is obtained and a filename and/or a folder name is created based on the schedule character data obtained, or the schedule character data is embedded in EXIF data and stored.

16 Claims, 10 Drawing Sheets

DIGITAL CAMERA

PORTABLE TELEPHONE

PDA

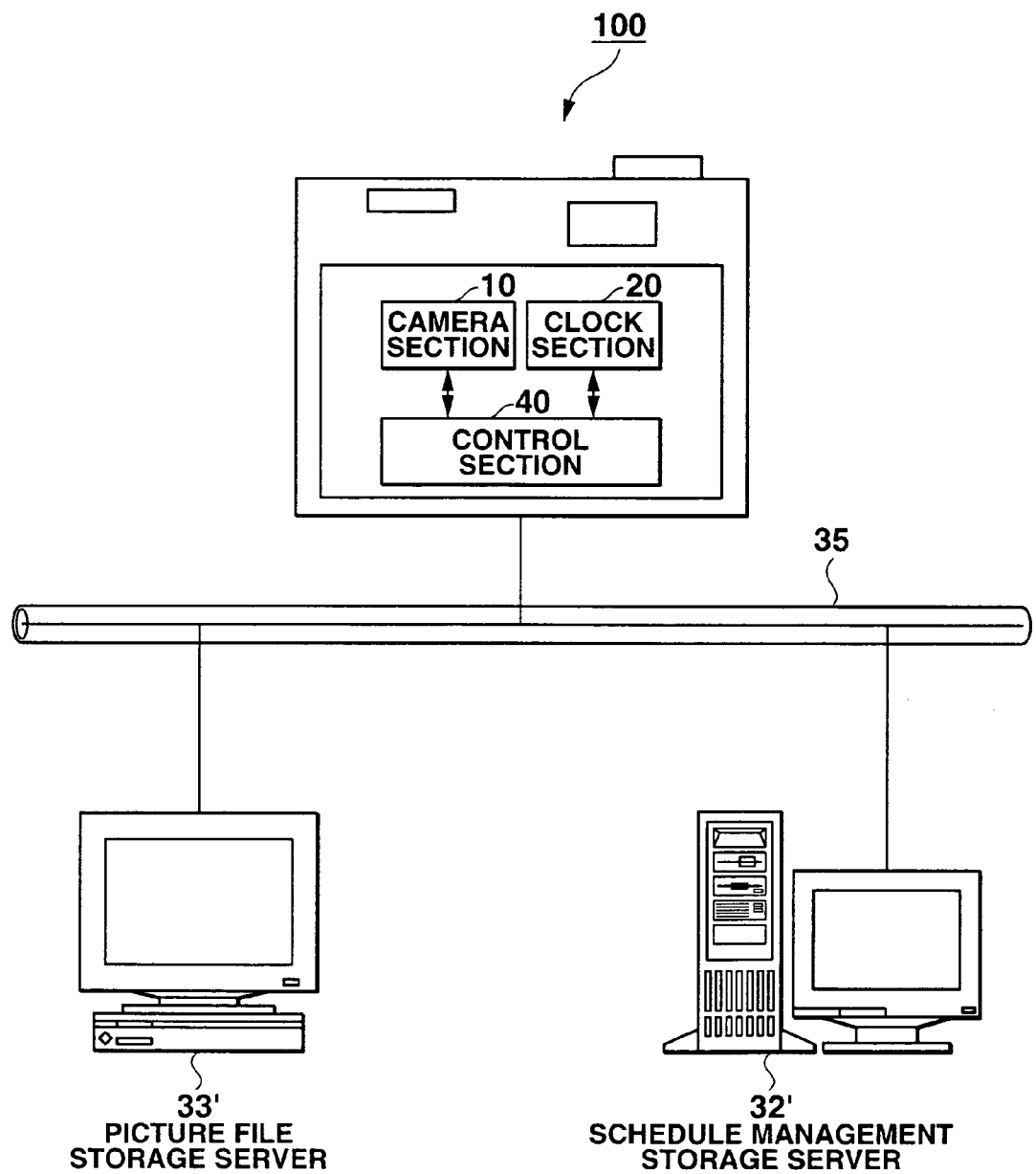

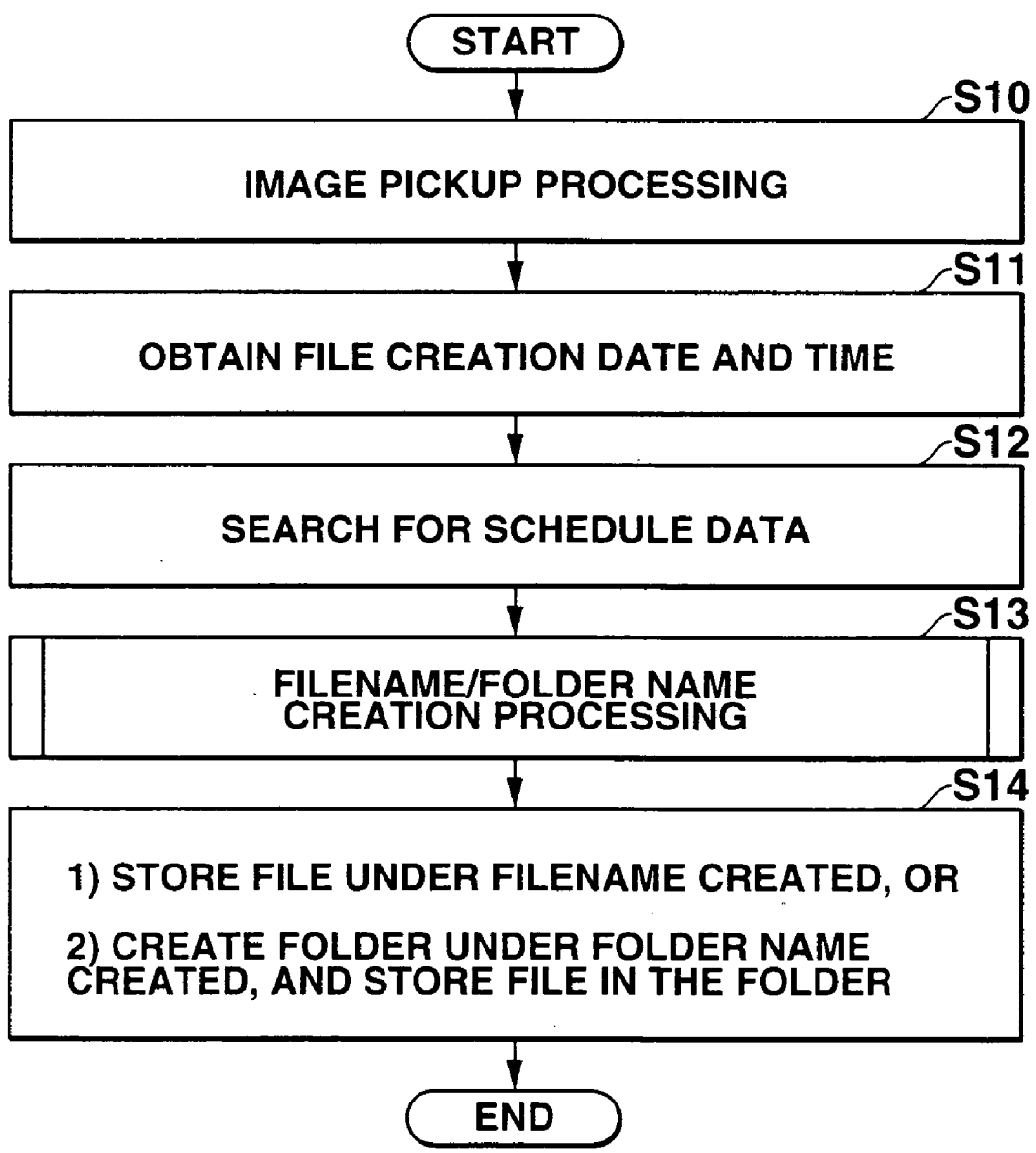

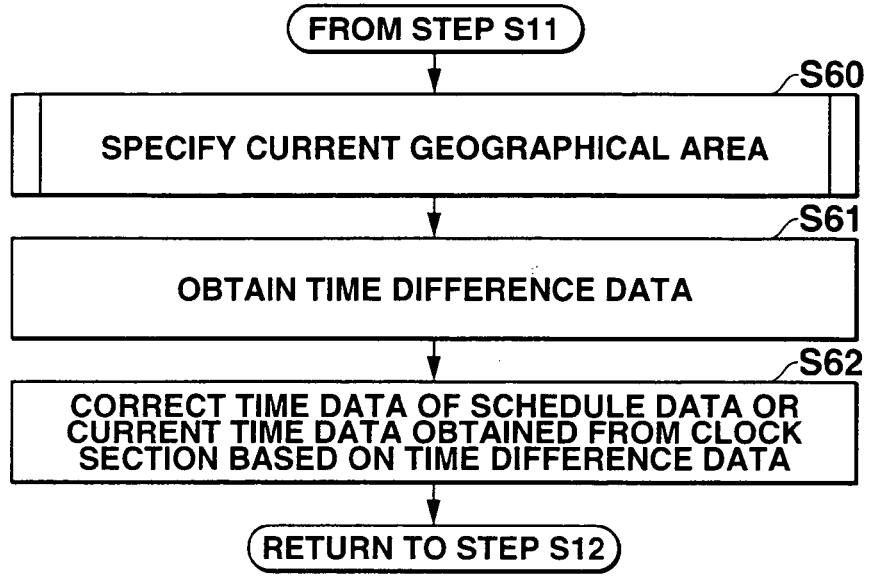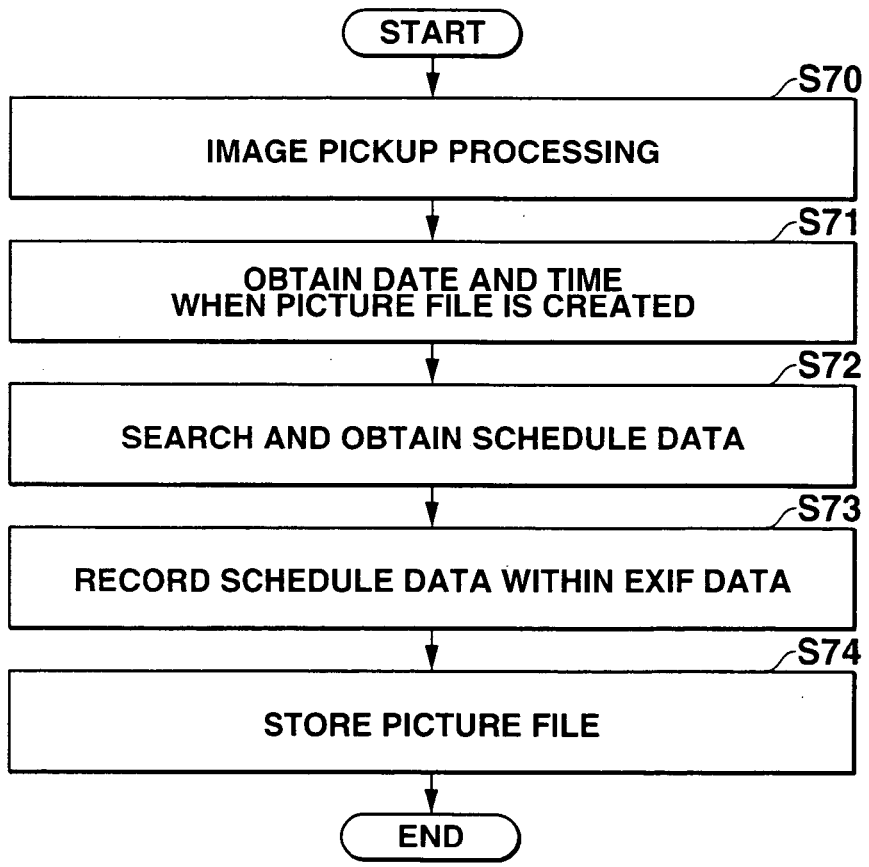

DATA FILE STORAGE DEVICE WITH AUTOMATIC FILENAME CREATION FUNCTION, DATA FILE STORAGE PROGRAM AND DATA FILE STORAGE METHOD

BACKGROUND OF THE INVENTION

1. Field of the Invention

The present invention relates to a data file storage device, a data file storage program and a data file storage method, for storing data files such as picture files.

2. Description of the Related Arts

Recently, among portable equipment such as portable telephones and PDAs (personal digital assistants) with schedule management functions that can store users' schedule, there are some that are being developed with built-in image pickup functions such as with digital cameras or movie cameras, and there are some that are being developed in the opposite configuration, where the schedule management functions are built-in in digital cameras.

Conventionally, in these equipment, filenames with serial numbers assigned, such as "0001.jpg," or filenames of random character strings are automatically set for picture files of imaged pictures that are picked up (or text files); alternatively, filenames in which a plurality of character data, such as "980310-suzukitaro-003.jpg," in which a date "980310," a user name "Suzuki Taro," and a serial number "003," are combined are automatically set.

SUMMARY OF THE INVENTION

In accordance with an embodiment of the present invention, a data file storage device comprises: a data file storage section that stores data files; a schedule data storage section that stores schedule data indicating schedule dates and times, as well as contents; a clock section that clocks the current date and time; a file creation date and time acquisition section that obtains from the clock section, when a data file is created, file creation date and time of the data file; a schedule acquisition section that obtains from among the schedule data stored in the schedule data storage section schedule data whose schedule date and time include the file creation date and time; and a name setting section that sets a filename of the data file to be stored in the data file storage section and/or a folder name of a file folder that stores the data file, using a part or all of a character string that represents a content of the schedule data obtained by the schedule acquisition section.

In one aspect of the present invention, the data file storage device may include a counter value output section for outputting a different counter value for each filename and/or folder name, wherein the name setting section sets the filename and/or folder name by using a character string that contains both the character string indicating the content of the schedule data obtained through the schedule acquisition section and a character string indicating a counter value outputted from the counter value output section.

The name setting section may set the filename and/or folder name through obtaining and using a designated part of the character string that indicates the content of the schedule data obtained by the schedule acquisition section.

In another aspect of the present invention, the data file storage device may include an instruction input request section for requesting an instruction input regarding whether or not to use as the filename and/or folder name a character string indicating the content of the schedule data that was obtained by the schedule acquisition section.

In another aspect of the present invention, the data file storage device may include a selection input request section for requesting, when a plurality of schedule data whose dates and times include the file creation date and time are obtained by the schedule acquisition section, a selection input regarding which of the plurality of schedule data be selected, wherein the name setting section sets the filename and/or folder name by using schedule data selected and inputted in response to a request from the selection input request section.

In one aspect of the present invention, if there is no schedule data among the schedule data stored in the schedule data storage section whose schedule date and time include the file creation date and time obtained by the file creation date and time acquisition section, the schedule acquisition section may obtain schedule data whose date and time are closest to the file creation date and time.

In another aspect of the present invention, if there is no schedule data among the schedule data stored in the schedule data storage section whose schedule date and time include the file creation date and time obtained by the file creation date and time acquisition section, the schedule acquisition section may obtain immediately preceding schedule data whose date and time are before the file creation date and time and closest to the file creation date and time, as well as immediately succeeding schedule data whose date and time are after the file creation date and time and closest to the file creation date and time; and the name setting section sets the filename of the data file to be stored in the data file storage section and/or the folder name of the file folder that stores the data file, using data of either the immediately preceding schedule data or the immediately succeeding schedule data.

Further, in another aspect of the present invention, the data file storage device may include a time difference data acquisition section for obtaining time difference data for a designated geographical area, and a file creation date and time correction section for correcting the file creation date and time based on the time difference data obtained by the time difference data acquisition section, wherein the schedule acquisition section obtains schedule data based on the file creation date and time corrected by the file creation date and time correction section.

In another aspect of the present invention, the data file storage device may be a digital camera with an imaging section, wherein, for a picture file of a picture picked up by the imaging section as the data file, a part or all of a character string indicating the content of the schedule data obtained by the schedule acquisition section is used to set the filename of the data file to be stored in the data file storage section and/or the folder name of the file folder that stores the data file.

Further, in another aspect of the present invention, the data file storage device may be a portable telephone with an imaging section, wherein, for a picture file of a picture picked up by the imaging section as the data file, a part or all of a character string indicating the content of the schedule data obtained by the schedule acquisition section is used to set the filename of the data file to be stored in the data file storage section and/or the folder name of the file folder that stores the data file.

Further, in another aspect of the present invention, the data file storage device may be a PDA device with imaging section, wherein, for a picture file of a picture picked up by the imaging section as the data file, a part or all of a character string indicating the content of the schedule data obtained by the schedule acquisition section is used to set the filename of the data file to be stored in the data file storage section and/or the folder name of the file folder that stores the data file.

In another aspect of the present invention, the data file storage section may be a file server connected via a network.

In another aspect of the present invention, the schedule data storage section may be a schedule management storage server connected via a network.

In accordance with another embodiment of the present invention, a data file storage device comprises: a data file storage section that stores data files; a schedule data storage section that stores schedule data indicating schedule dates and times, as well as contents; a clock section that clocks the current date and time; a file creation date and time acquisition section that obtains from the clock section, when a data file is created, file creation date and time of the data file; and a schedule acquisition section that obtains from among the schedule data stored in the schedule data storage section schedule data whose schedule date and time include the file creation date and time, wherein a part or all of character string data of a character string that represents the content of the schedule data obtained through the schedule acquisition section is added to the data file and stored.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 3 is an example in which a part or all of a storage section according to the present invention is realized by a server connected to a network.

FIG. 4 is a flowchart for describing a data file storage processing.

FIG. 9 is a flowchart for describing a processing according to another embodiment example.

FIG. 10 is a flowchart for describing a processing for storing schedule data in a data file in accordance with another embodiment example.

DESCRIPTION OF PREFERRED EMBODIMENTS

Referring to FIGS. 1-11, a data file storage device 100 to which the present invention is applied will be described in detail.

The data file storage device 100 is provided with a schedule management function for storing schedules, as well as an image pickup function.

EMBODIMENT EXAMPLE 1

Figure 1:
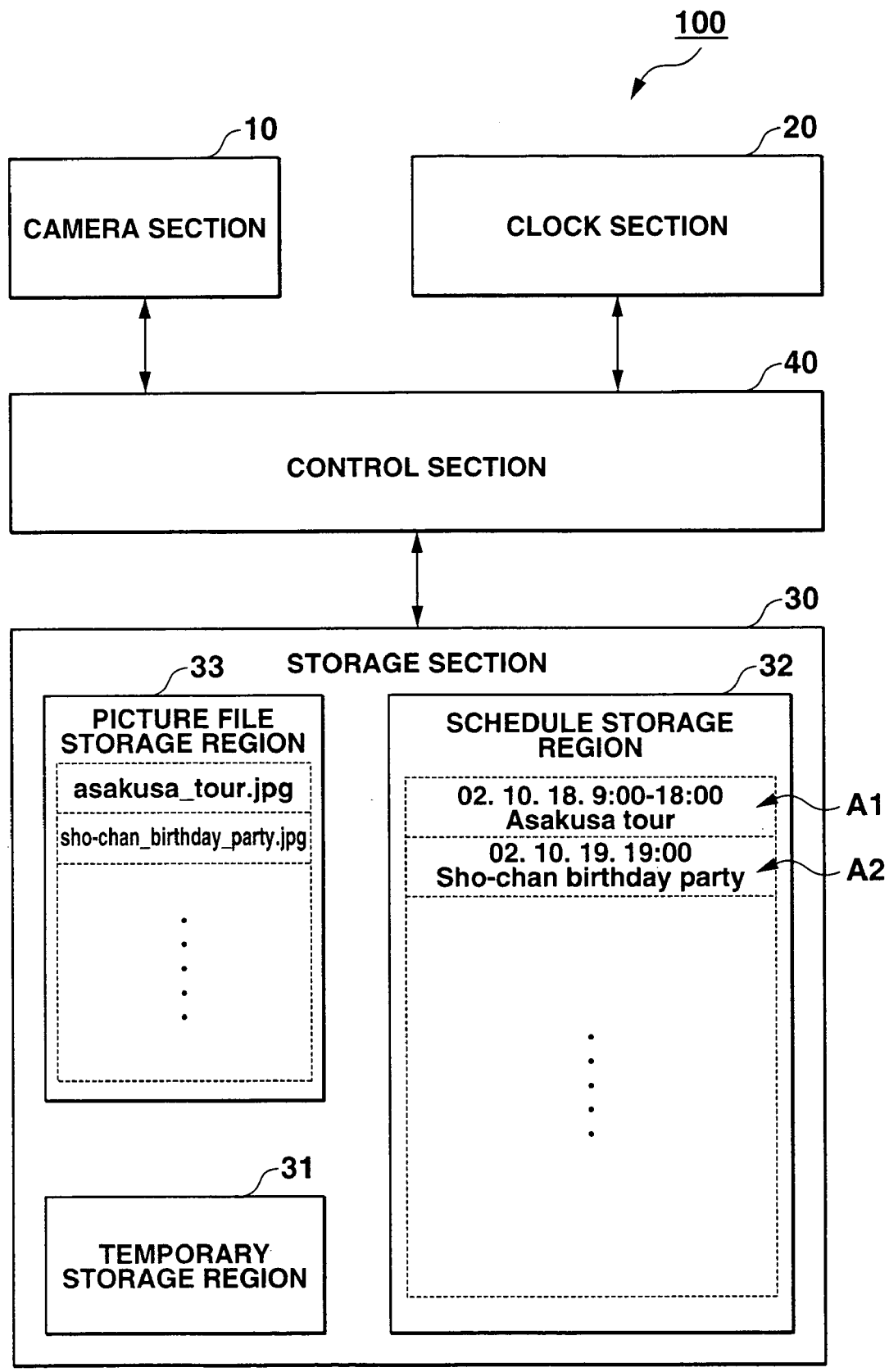
FIG. 1 is a block diagram of an internal configuration of a data file storage device to which the present invention is applied.
Figure 2A:
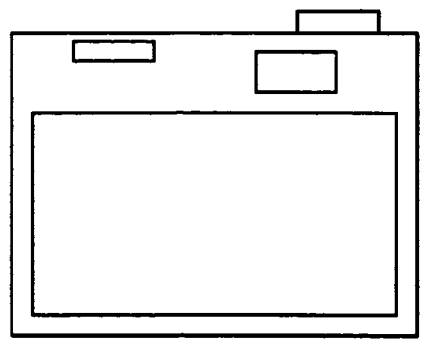
FIG. 2 are specific examples of electronic equipment to which a data file storage device according to the present invention is applied.
Figure 2B:
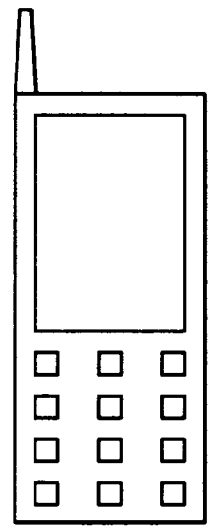
Figure 2C:
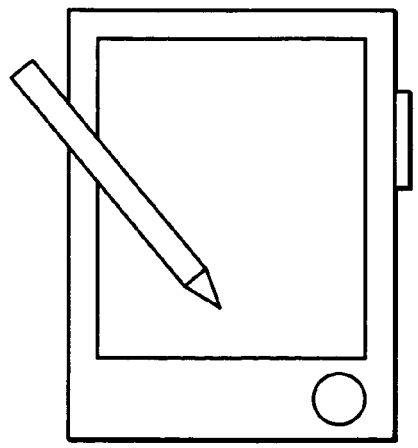

First, a configuration of the data file storage device 100 will be described. FIG. 1 shows an internal configuration of the data file storage device 100 to which the present invention is applied. Specifically, the data file storage device 100 in FIG. 1 can be applied to, for example, a digital camera as shown in FIG. 2A, a portable telephone as shown in FIG. 2B, or a PDA as shown in FIG. 2C.

As shown in FIG. 1, the data file storage device 100 is structured by comprising a camera section 10, a clock section 20, a storage section 30, and a control section 40.

The camera section 10 creates picture files of imaged pictures that are picked up, and the clock section 10 clocks the current time.

The storage section 30 has a plurality of storage regions, such as a temporary storage region 31, a schedule storage region 32, and a picture file storage region 33. The temporary storage region 31 temporarily stores picture files created by the camera section 10; the schedule storage region 32 stores schedule data inputted in advance (hereinafter sometimes called "schedules registered in advance"); and the file storage region 33 stores picture files for which filenames created by the control section 40 are set, as well as picture files in file folders for which folder names are set by the control section 40.

As shown in FIG. 3, of the internal components of the data file storage device 100 according to the present invention, all storage regions of the storage section 30 or a part of storage regions of the storage section 30, e.g., the picture file storage region 33 or the schedule storage region 32, can be connected for communications via a network such as a bus 35. For example, the storage section 30 can have a nonvolatile memory such as magnetic or optical recording media or semiconductor, and such recording media can be either fixed or mounted in a freely detachable manner. A part or all of programs and data stored in the storage section 30 can be received from other equipment via a communications network such as WAN (wide area network) or LAN (local area network) and stored. Furthermore, the recording media can be recording media of other host computers constructed on the communications network. The storage section 30 may be recording media of a server or a client constructed on the communications network. In other words, for example, the picture file storage region 33 can be provided on a file server connected via a network, or the schedule storage region 32 can exist in a storage section of a desktop PC connected via USB, for example, such that the digital camera or the portable telephone according to the present invention receives schedule data from the desktop PC to execute the present invention.

Each schedule data may consist of data, such as, for example, a character string indicating time information such as date and time, as well as the contents of the corresponding schedule.

For example, as shown in FIG. 1, among a plurality of schedule data stored in the schedule storage region 32, one schedule data (see A1 in FIG. 1) consists of a character string that indicates date and time "02. 10. 18. 9:00-18:00" and content "Asakusa tour" (i.e., a schedule indicating being in Asakusa from 9 o'clock to 18 o'clock on Oct. 18, 2002), while another schedule data (see A2 in FIG. 1) consists of a character string that indicates date and time "02. 10. 19.

19:00" and content "Sho-chan birthday party" (i.e., schedule data indicating attendance at Sho-chan's birthday party at 19 o'clock on Oct. 19, 2002).

Hereinafter, character string data that indicate a schedule content are called "schedule character data."

Filenames are, as shown in FIG. 1, "asakusa_tour.jpg" (a picture file that corresponds to the schedule indicated in A1) and "sho-chan_birthday_party.jpg" (a picture file that corresponds to the schedule indicated in A2), for example, that are stored in the picture file storage region 33, and folder names are "Asakusa tour" and "Sho-chan birthday party," for example. These filenames and folder names have been created and named through a filename/folder name creation processing described below.

Figure 5:
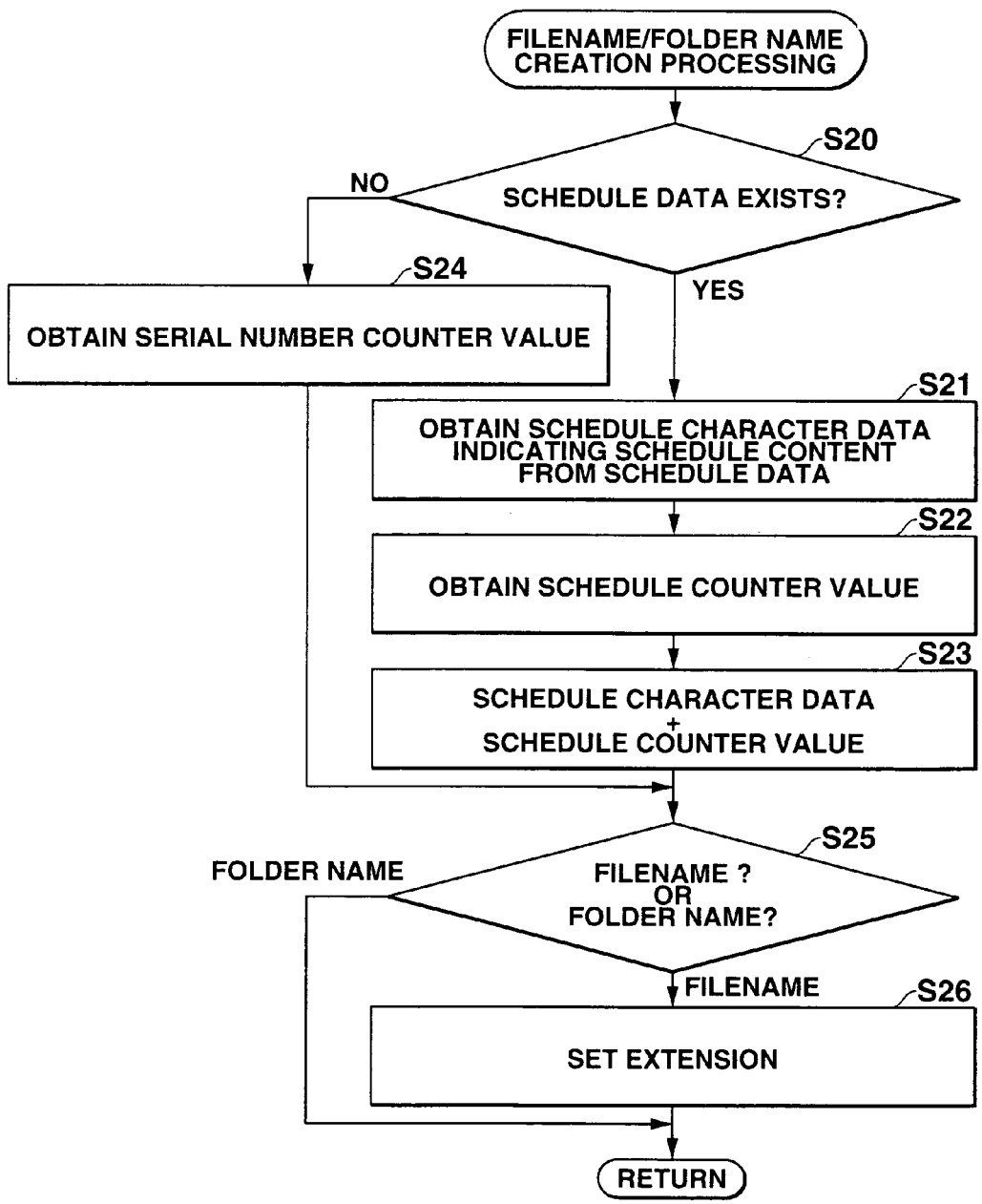
FIG. 5 is a flowchart for describing a filename/folder name creation processing.

The storage section 30 stores computer-readable data file storage programs for executing a data file storage processing and the filename/folder name creation processing that are indicated in flowcharts in FIG. 4 and FIG. 5, respectively.

The control section 40 stores a user's schedule in the schedule storage region 32 and searches and reads the same from the schedule storage region 32 as necessary. The schedule data can be inputted or erased, as necessary.

The control section 40 reads the data file storage program from the storage section 30 and executes the program (see flowcharts in FIGS. 4 and 5).

In other words, when the camera section 10 picks up a picture, the control section 40 obtains image pickup date and time (i.e., the date and time a picture file was created; hereinafter called the "file creation date and time") from the clock section 20 by executing the data file storage program, and searches schedule data stored in the schedule storage region 32 for schedules whose dates and times include the file creation date and time obtained (hereinafter called "schedule(s) that match(es) the file creation date and time").

If there is a schedule that matches the file creation date and time in the schedule data stored in the schedule storage region 32, the control section 40 obtains a part or all of the corresponding schedule character data (e.g., "Sho-chan birthday party" or simply "Birthday party"; hereinafter called the "schedule part data"), as well as a schedule counter value for counting picture files for each schedule (e.g., a four-digit natural number such as "0003," but not limited to this), and creates a filename or a folder name based on the schedule part data or creates a filename or a folder name based on a combination of character data indicating the schedule counter value and the schedule part data.

An example of such a filename would be "sho-chan_birthday_party_0003.jpg" and an example of such a folder name would be "sho-chan birthday party."

If there is no schedule in the entire schedule data stored in the schedule storage region 32 that matches the file creation date and time, the control section 40 obtains a serial number counter value (which is, for example, a five-digit natural number such as "00055," but not limited to this particular example) for counting picture files such as this that do not match any schedule, and creates a filename and/or a folder name based on character data indicating the serial number counter value.

An example of such a filename would be "00055.jpg" and an example of such a folder name would be "00055."

The control section 40 performs management processing, such as initializing and incrementing the schedule counter for each schedule, and performs similar management processing on the serial number counter. In particular, the control section 40 increments the counter value by only one whenever it obtains the schedule counter value or the serial number counter value.

Next, the operation of the data file storage device 100 will be described. FIG. 4 shows a flowchart for describing the data file storage processing.

First, the camera section 10 performs an image pickup processing; when a picture file of a picture picked up is created, the control section 40 temporarily stores the picture file in the temporary storage region 31 and begins to execute the data file storage program (step S10).

After step S10, the control section 40 obtains the file creation date and time of the picture file from the clock section 20 (step S11), and searches among the schedule data stored in the schedule storage region 32 for the schedule data that matches the file creation date and time (step S12).

After step S12, the control section 40 performs the filename/folder name creation processing shown in the flowchart in FIG. 5 and creates a filename for the picture file and/or a folder name for a file folder for storing the picture file (step S13).

Next, if a filename was created in step S13, the control section 40 assigns the filename to the picture file, and stores the picture file in the picture file storage region 33. On the other hand, if a folder name was created in step S13, the control section 40 assigns a predetermined filename (e.g., a filename set in the filename/folder name setting processing in step S13) to the picture file, and stores the picture file in the file folder with the folder name.

Next, the filename/folder name creation processing in step S13 in FIG. 4 will be described. The flowchart for describing the filename/folder name creation processing is shown in FIG. 5. First, a description will be made as to a situation in which there is only one schedule data that matches the file creation date and time.

If there is only one schedule data that matches the file creation date and time obtained in step S11 among the schedule data stored in the schedule storage region 32 (step S20: Yes) (a situation in which there are two or more is described later), the control section 40 obtains schedule character data that indicates the schedule content from the schedule data that matches (step S21).

For example, if the schedule data that matches the file creation date and time is data indicated by A2 in FIG. 1, the schedule character data that indicates the content of the schedule is "Sho-chan birthday party."

After step S21, the control section 40 searches for and obtains a schedule counter value that corresponds to the schedule obtained in step S21 (step S22). If there is no schedule counter that corresponds to the schedule obtained in step S21, the control section 40 judges the file to be the first file processed during the period of the schedule; accordingly, the control section 40 clears the schedule counter value for the schedule data and sets it to "000," for example.

The character data indicating the schedule counter value and the schedule character data obtained in step S21 are combined to create new character data to be used as a filename or a folder name (step S23).

For example, if the schedule character data obtained in step S21 is "Sho-chan birthday party" and the schedule counter value obtained in step S22 is "0003," the character data resulting from combining the schedule character data and the character data indicating the schedule counter value is "Sho-chan birthday party 0003."

Let us return to step S20. If there is no schedule that matches the file creation date and time obtained in step S11 among all schedule data stored in the schedule storage region 32 (step S20: No), the control section 40 obtains a serial number counter value (e.g., "00055") as character data for creating a filename or a folder name (step S24). Instead of using the serial number counter, other known technology can be used, such as using date or time to obtain character data, for example, to automatically create filenames/folder names.

Next, the control section 40 requests a selection input regarding whether a filename or a folder name is to be created from the character data obtained in step S23 or step S24 (e.g., "Sho-chan birthday party 0003" or "0055") (step S25).

If a selection input to create a filename is made in step S25 (step S25: filename), the control section 40 attaches to the character data an extension appropriate for the file format of the picture file (e.g., JPEG) (step S26) and sets a filename ("sho-chan_birthday_party_0003.jpg" or "00055.jpg"). If a selection input to create a folder name is made (step S25: folder name), the character data is set unaltered as a folder name (e.g., "Sho-chan birthday party 0003" or "00055").

Although the user makes a selection input regarding whether to set the character data as a filename or a folder name in step S25, the selection can be made automatically by the program using the method described below.

For example, if a schedule counter cannot be found in step S22, i.e., no picture files of imaged pictures for the schedule obtained in step S21 have been stored so far, the schedule counter value is cleared and a file folder whose folder name is the schedule character data that indicates the content of the schedule is created in a predetermined storage region. The picture file of the picked up picture, whose filename is a character string that combines the schedule character data and the schedule counter value, is stored in the folder created. Thereafter, whenever the same schedule is obtained in step S21, a picture file of each picked up picture is stored in the folder.

More specifically, when the schedule character data "Sho-chan birthday party" is obtained for the first time, a folder with the name "Sho-chan birthday party" is created, and the picture data of the picked up picture obtained at this time is stored under the filename "sho-chan_birthday_party_0000.jpg" in the folder "Sho-chan birthday party." Thereafter, picture files of the picked up pictures can be stored according to the following method: whenever the schedule character data "Sho-chan birthday party" is obtained, searching the schedule counter value in step S22 reveals that this is not the first time this schedule has been obtained, and, without having to create a new folder, picture files of the pictures picked up are stored in the folder whose name is the same as the schedule character data.

As described above, according to the data file storage device 100 to which to present invention is applied, when assigning a filename to a picture file or a folder name for storing the picture file, a schedule that matches the file creation date and time of the picture file is selected from among schedules registered in advance, and the filename or the folder name is created based on the content of the schedule.

It is noted that the description of the embodiment example 1 indicates one example of the data file storage device, the data file storage program and the data file storage method according to the present invention and does not limit the present invention. Many modifications can be made to the configuration details, operational details and numerical values of the data file storage device 100 according to the embodiment example 1, without departing from the subject matter of the present invention.

For example, the schedule counter and the serial number counter are described as a four-digit natural number and a five-digit natural number, respectively, but they may be natural numbers of any number of digits. Furthermore, they do not have to be natural numbers and can instead be alphabets ("a," "b," etc.) or characters of any language including Japanese hiragana and katakana characters, and they can be either full-size or half-size characters. In other words, anything can be used as long as it distinguishes each filename and each folder name.

EMBODIMENT EXAMPLE 2

Next, a description will be made as to a filename/folder name creation processing, in which the user can select from among filenames/folder names that are based on a plurality of schedule data that match a file creation date and time among schedules registered in advance, and filenames/folder names based on serial number counter values. In such a case, according to the embodiment example 2, filename or folder name candidates are created based on various schedule data or serial number counter values, and the user selects which of the plurality of candidates should ultimately be used as a filename or a folder name. An example in which such a processing takes place is described below in embodiment example 2.

Figure 6:
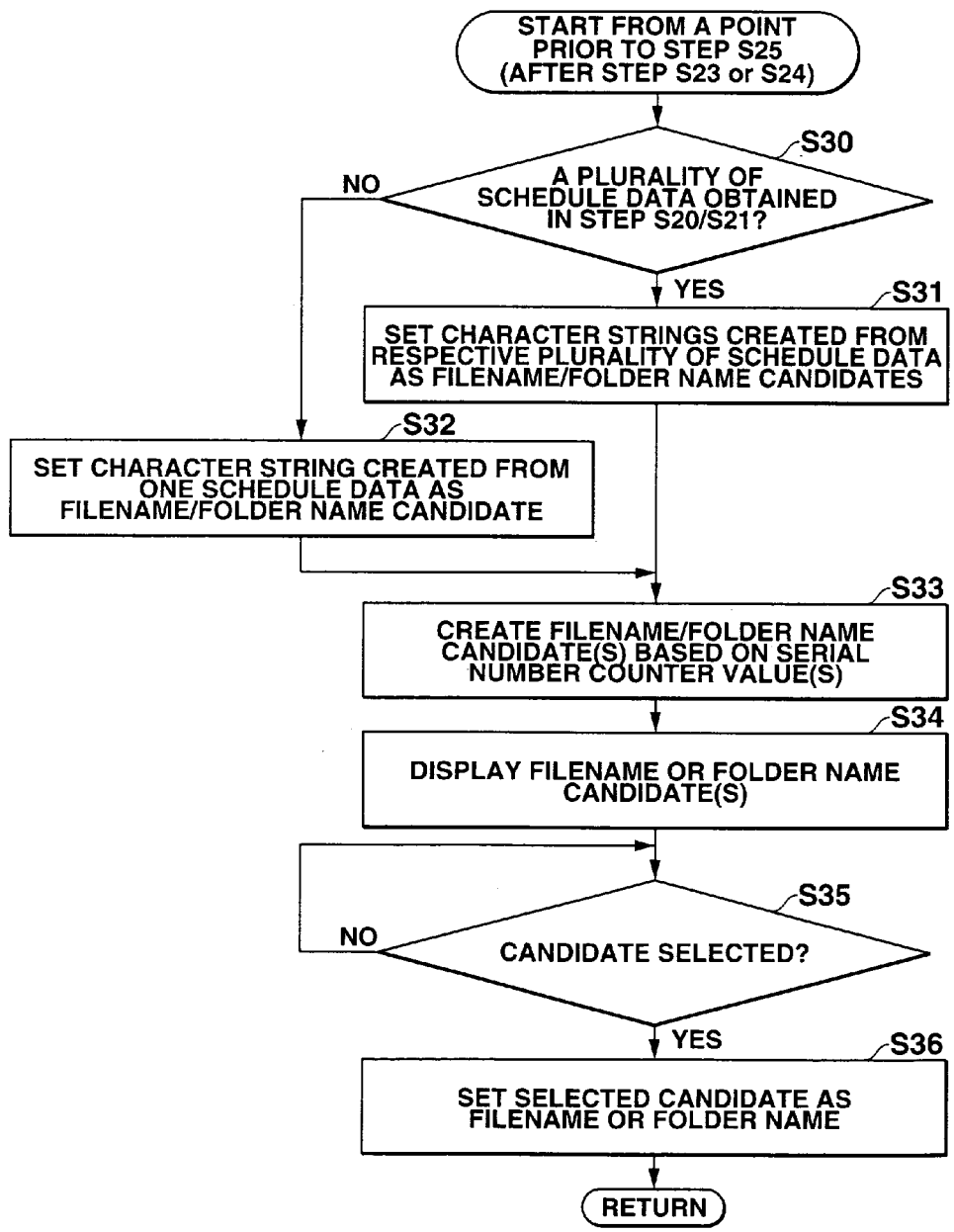
FIG. 6 is a-flowchart for describing a processing according to another embodiment example.

In embodiment example 2, a processing indicated in a flowchart in FIG. 6 is added to the filename/folder name creation processing shown in the flowchart in FIG. 5. In other words, in a data file storage program according to the embodiment example 2, a program for performing the processing shown in the flowchart in FIG. 6 is added to the data file storage program according to the embodiment example 1 and consists of a program in which changes that are required accordingly are made as necessary to the program indicated by the flowchart in FIG. 5.

A data file storage device according to the embodiment example 2 is identical to the data file storage device 100 according to the embodiment example 1.

The following is a description of the contents of processings of the flowchart in FIG. 6.

First, the control section 40 proceeds the process to processings according to the flowchart in FIG. 6 from a point prior to step S25 (in other words, after step S23 or S24) in FIG. 5.

After step S23 or S24, the control section 40 determines whether a plurality of schedule data are obtained in steps S20 and S21 in FIG. 5 (step S30); if there is a plurality of schedule data obtained (step S30: Yes), character strings created from the schedule character data of the respective plurality of schedule data are set as filename/folder name candidates, respectively, (step S31). If there is only one schedule data obtained (step S30: No), the character string created from schedule character data of the schedule data is set as a filename/folder name candidate (step S32).

After step S31 or S32, the control section 40 additionally creates filename/folder name candidate(s) based on serial number counter value(s) (step S33).

Then, the control section 40 displays on a display screen, not shown, the filename/folder name candidates created in step S31 or S32 and step S33 (step S34); requests a selection input regarding which one among all the candidates should be used as a filename or a folder name (step S35); and sets as the filename or the folder name the candidate selected in response to the request (step S36).

As a result, according to the embodiment example 2, even if there are two or more schedules that match the file creation date and time in the schedules registered in advance, a filename or a folder name is created for each of the plurality of schedules, and the user can select the desired filename/folder name from among them.

In this case, a flag that indicates whether or not to use the schedule content as a filename or a folder name (settings such as ON: use, OFF: do not use) can be provided for each schedule data.

In addition to filenames or folder names based on schedule contents, filenames or folder names based on serial number counter values (e.g., "00055") can also be created; consequently, if there is a schedule that matches the file creation date and time of a picture file but if the picture file is unrelated to the schedule, the user can set a filename or a folder name that is created based on the serial number counter value.

EMBODIMENT EXAMPLE 3

Furthermore, a part or all of the character string indicated by the schedule character data obtained in step S21 in FIG. 5 can be selected by the user, and a filename or a folder name can be created based on the character string data selected. An example in which such a processing takes place is shown in the following embodiment example 3.

Figure 7:
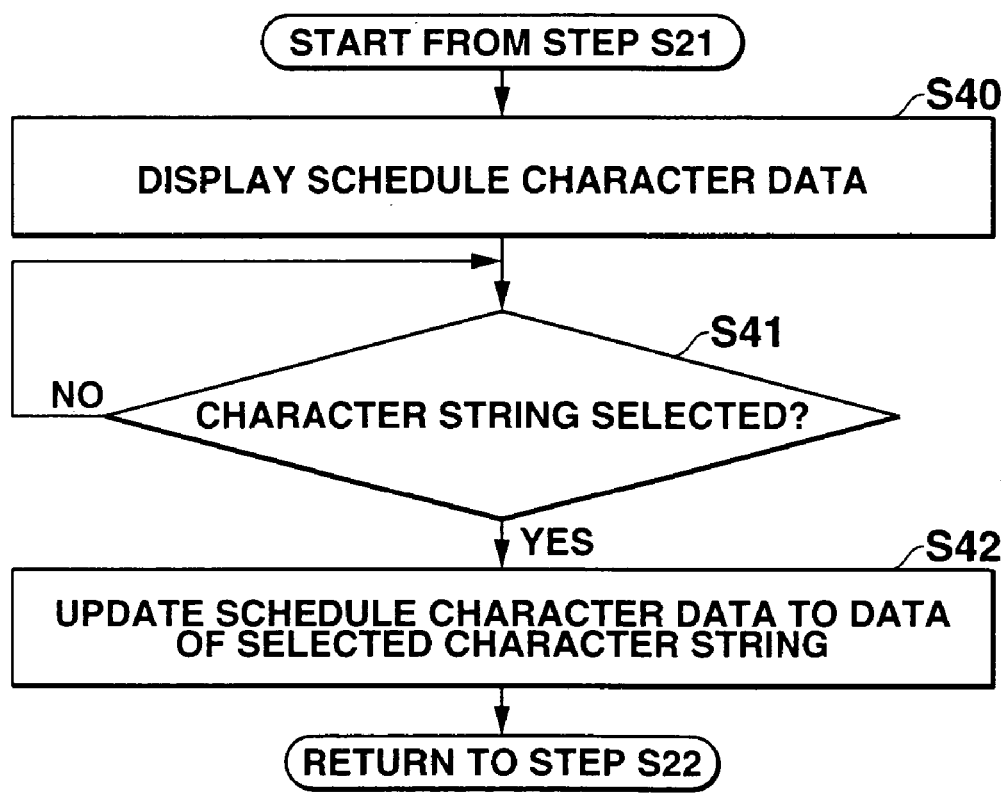
FIG. 7 is a flowchart for describing a processing according to another embodiment example.

In this case, a processing indicated in a flowchart in FIG. 7 is added to the filename/folder name creation processing shown in the flowchart in FIG. 5. In other words, in a data file storage program according to the embodiment example 3, a program for performing the processing shown in the flowchart in FIG. 7 is added to the data file storage program according to the embodiment example 1 and consists of a program in which changes that are required accordingly are made as necessary to the program indicated by the flowchart in FIG. 5.

A data file storage device according to the embodiment example 3 is identical to the data file storage device 100 according to the embodiment example 1.

The following is a description of the contents of processings of the flowchart in FIG. 7.

First, the control section 40 displays on the display screen the schedule character data obtained in step S21 (step S40).

Next, the control section 40 requests an instruction input regarding which part of the character string displayed should be selected (step S41); when the instruction input is made (step S41: Yes), the control section 40 updates the original schedule character data to the character string data selected (step S42) and proceeds to step S22 in FIG. 5. In terms of how to make an instruction input regarding which part of the character string should be selected, of the character string displayed, the part of the character string that is selected can be highlighted using a cursor, for example. In step S42, instead of directly updating the original schedule character data, the original schedule character data can be copied to a working memory as a filename candidate character string, and the character string in the working memory can be updated and used as the character string that becomes the basis for creating a filename/folder name.

As a result, according to the embodiment example 3, if the character string that indicates the schedule content is too long, the user can select only a part of the entire character string desired to be used as a filename or a folder name, and create a filename or a folder name based on the selected part. For example, if the character string that indicates a schedule content is "Sho-chan five years old birthday party," this character string is too long to use as a filename or a folder name; the user can select only "birthday" from the entire character string and create a filename or a folder name based on the character string "birthday" (for example, "birthday_01.jpg" as a filename, "birthday" as a folder name). Furthermore, a plurality of parts from a character string can be made selectable according to the present embodiment example, so that a filename/folder name can be created by combining a plurality of partial character strings selected.

EMBODIMENT EXAMPLE 4

Furthermore, even in situations in which there is no schedule that directly matches the file creation date and time in the processing that takes place in step S12 through step S13 in FIG. 4, one schedule among a plurality of schedules that are registered in times in proximity of the file creation date and time can be selected, or a schedule whose time is closest to the file creation date and time can be automatically selected. An example in which such a processing takes place is indicated in the following embodiment example 4.

Figure 8:
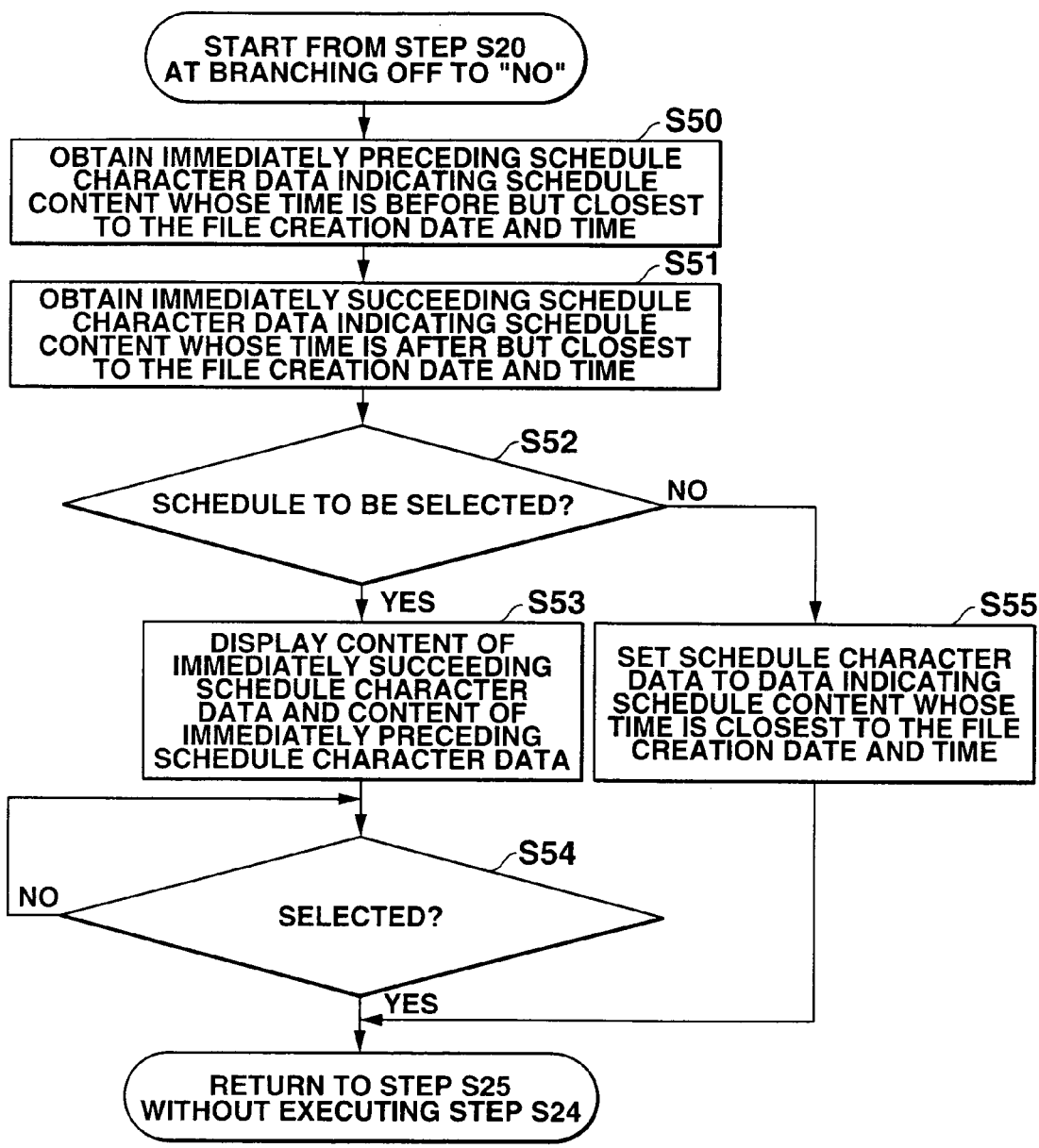
FIG. 8 is a flowchart for describing a processing according to another embodiment example.

In this case, a processing indicated in a flowchart in FIG. 8 is added to the processing shown in the flowchart in FIG. 5. In other words, in a data file storage program according to the embodiment example 4, a program for performing the processing shown in the flowchart in FIG. 8 is added to the data file storage program according to the embodiment example 1 and consists of a program in which changes that are required accordingly are made as necessary to the program indicated by the flowchart in FIG. 5.

A data file storage device according to the embodiment example 4 is identical to the data file storage device 100 according to the embodiment example 1.

The following is a description of the contents of processings of the flowchart in FIG. 8.

First, if there is no schedule that matches the file creation date and time in step S20 (step S20: No), the control section 40 selects from among schedule data stored in the schedule storage region 32 a schedule whose time is before but closest to the file creation date and time, and obtains schedule character data that represents the content of the schedule (hereinafter called the "immediately preceding schedule character data") (step S50).

Further, the control section 40 selects from among schedule data stored in the schedule storage region 32 a schedule whose time is after but closest to the file creation date and time, and obtains schedule character data that represents the content of the schedule selected (hereinafter called the "immediately succeeding schedule character data") (step S51).

Then, the control section 40 requests an instruction input regarding whether to have the user select the data of one of the immediately preceding schedule character data and the immediately succeeding schedule character data, or to have the schedule character data of the schedule closest to the file creation date and time automatically selected (step S52). How to decide which method to use, i.e., to have the user select or to have the selection automatically made, regarding which schedule character data to use can be set in advance, in which case no instruction input would be required, or a setting can be made at the time the equipment ships out of the factory so that only one method can be executed (in the latter case, both processing programs naturally do not have to be stored in the device main body).

If in step S52, there is an instruction input to have the user select either the immediately preceding schedule character data or the immediately succeeding schedule character data (step S52: Yes), the control section 40 displays on the display screen the content represented by the immediately preceding schedule character data and the content represented by the immediately succeeding schedule character data (step S53).

Next, the control section 40 requests an instruction input regarding which of the immediately preceding schedule character data and the immediately succeeding schedule character data should be selected (step S54); when one or the other is selected (step S54: Yes), the control section 40 proceeds to step S25. In this case, the control section 40 does not perform the processing in step S24.

After branching off step S54 to "Yes", a processing similar to the processing that takes place in step S22 and step S23 can be performed additionally. By so doing, character data resulting from combining schedule character data with character data indicated by a schedule counter value (e.g., "Asakusa tour 0001") can be set as a filename and/or folder name also in the embodiment example 4.

Although only schedules that are set in times before and after and closest to the file creation date and time are extracted for the user to select from according to the embodiment example 4, a plurality of schedules both before and after can be extracted and the user can select a character string to use as a filename/folder name from among four, six, etc. schedule character data. Alternatively, all schedules that are within a predetermined time range, whose reference is the file creation date and time, can be extracted and the user can select a character string to use as a filename/folder name from among the schedules.

As a result, according to the embodiment example 4, if no schedule that matches the file creation date and time is registered, the user can select one content from among contents of schedules that are registered in times close to the file creation date and time and create a filename or a folder name based on the content selected. Alternatively, in such a case, the schedule whose time is closest to the file creation date and time can be automatically selected and a filename or a folder name can be created based on the content of the schedule selected.

For example, if the file creation date and time of a picture file is December 18, 22:30 and no schedule that matches this date and time is registered, and if the schedules whose times are before and after but closest to the file creation date and time are a first schedule with the date and time "December 18, 18:00-20:00" and the content "year-end party" and a second schedule with the date and time "December 18, 23:00" and the content "trip on a night train," the user can select the content of one or the other of the two schedules, or the second schedule that is closest to the file creation date and time can be automatically selected, in order to create a filename or a folder name for the picture file.

EMBODIMENT EXAMPLE 5

When an image pick up geographical area (i.e., the location where the data file storage device 100 is taken to) registered in a schedule is a foreign country and there is therefore a time difference between the file creation date and time (i.e., the date and time as clocked by the clock section 20) and the date and time of the schedule (as set by the local time), the time difference can be automatically corrected to make it possible for the schedule search (step S12 in FIG. 4) to be performed properly. An example in which such a processing takes place is indicated in the following embodiment example 5.

In this case, a processing indicated in a flowchart in FIG. 9 is added to the processing shown in the flowchart in FIG. 4. In other words, in a data file storage program according to the embodiment example 5, a program for performing the processing shown in the flowchart in FIG. 9 is added to the data file storage program according to the embodiment example 1 and consists of a program in which changes that are required accordingly are made as necessary to the program indicated by the flowchart in FIG. 4.

A data file storage device according to the embodiment example 5 is identical to the data file storage device 100 according to the embodiment example 1.

The following is a description of the contents of processings of the flowchart in FIG. 9. In the following description, let us assume that the time setting for schedule data (in this case, data for schedules that take place in a foreign country) stored in the schedule storage region 32 is based on the local time of the foreign country, which is the travel destination.

First, after obtaining the file creation date and time in step S11, the control section 40 specifies the current geographical area of the data file storage device 100 (step S60). In this case, the current geographical area can be specified by the user from among geographical area data stored in advance in the storage section 30, or a GPS can be built-in and used to automatically specify the current geographical area, for example.

Then, the control section 40 obtains time difference data between the time in the current geographical area and the time as clocked by the clock section 20 (i.e., the time in the user's home country or residence area) based on the data indicating the current geographical area specified (step S61), the time difference data can be stored in advance in the storage section 30 for each geographical area registered, or can be obtained from an external storage device as necessary. When travel information (e.g., destination country name or the information with which time zone can be specified) delivery can be received from a travel agency's server, for example, the time difference data can be obtained based on the travel information received by a terminal.

Based on the time difference data obtained, the control section 40 corrects either the time of the schedule data set in the local time or the current time obtained from the clock section 20 (step S62). If it is the time of schedule data set in local time that is corrected, the trouble the user went to in order to set the time in the local time would be wasted and the time will be corrected to the time in the original home country or the user's residence area; for this reason, it is desirable in step S62 to correct the current time obtained from the clock section 20 (i.e., the time in the home country). The time corrected in this way is used to perform the schedule search processing as shown in FIG. 4 and FIG. 5.

EMBODIMENT EXAMPLE 6

Further, when the data file storage device 100 is capable of creating picture files having EXIF (Exchangeable Image File) data, schedule data (schedule character data or schedule part data; and hereafter the same applies) for the picture files may preferably be stored as "image titles" in the EXIF data.

An example that performs the processings described above is indicated in the embodiment example 6. As a data file storage program in the embodiment example 6, a program that performs a process indicated in FIG. 10 is used instead of the program that performs the data file storage process indicated in FIG. 4 (or used selectively with the program relating to FIG. 4).

Also, a data file storage device of the embodiment example 6 is equivalent to one in which the data file storage device 100 in the embodiment example 1 is made to handle EXIF (hereafter referred to as a "data file storage device 100a").

Hereunder, the contents of the process indicated in a flowchart in FIG. 10 will be described.

First, when an image pickup processing by the camera section 10 is performed, and a picture file of a picture picked up is created, the control section 40 temporarily stores the picture file in the temporary storage region 31 (step S70).

After step S70, the control section 40 obtains file creation date and time of the picture file from the clock section 20 (step S71), searches among the schedule data stored in the schedule storage region 32 for schedule data that matches the file creation date and time, and obtains the schedule data that matches the date and time (step S72).

The control section 40 records the schedule data obtained in the stage in step S72 as a "picture title" within EXIF data in the picture file (step S73).

Thereafter, the control section 40 causes the picture file storage region 33 to store the picture file that records the schedule data in its EXIF data (step S74).

It is noted that EXIF data is in a picture file format, that is stipulated by JEIDA (Japan Electronic Industry Development Association), and that can embed thumbnail images and data such as image pickup information within picture data in a JPEG picture format. More specifically, it is realized by placing within data in a JPEG format a predetermined one of application markers (punctuation codes representing punctuations of data) reserved for each application, and insert thereafter data in a format that is stipulated by the EXIF standard. When schedule data is embedded within EXIF data as in the present embodiment example, a character string of the schedule data with a tag specified in the EXIF format added thereto may be embedded. In this case, as the tag, for example, an Image Description tag (a tag indicating that a text that describes the picture follows thereafter), which has been already specified in the EXIF format, may be used; and schedule data may be placed behind such a tag. Alternatively, a new tag may be defined in a form according to an individual maker's definition, and such a tag may be used. Also, the method to embed information based on the schedule data within the picture file may be realized by any one of a variety of formats, without being limited to the method using the EXIF data format.

EMBODIMENT EXAMPLE 7

Furthermore, a communications terminal with camera function (for example, portable telephone, digital camera, PDA, etc.) may preferably be equipped with the data file storage device 100a that can handle EXIF in the embodiment example 6 described above.

Such an example is indicated in the embodiment example 7 below. In the embodiment example 7, two communications terminals with camera function that send and receive picture files (hereafter referred to as a "first communications terminal 1" and a "second communications terminal 2") are each equipped with the same device as the data file storage device 100a.

It is noted that the first communications terminal 1 and the second communications terminal 2 are portable telephones with camera function; and each of them is equipped with a variety of functions necessary for a portable telephone, such as, a data communications section that sends and receives data, a display section such as an LCD (Liquid Crystal Display) or the like that displays a variety of data contents, an input section for inputting various instructions, etc.

However, for the sake of simplification, illustrations of the respective components (except the data file storage device 100a) and their detailed description are omitted. Also, the same reference numbers are assigned to the sections of the data file storage devices 100a for the first communications terminal 1 and the second communications terminal 2.

Figure 11:
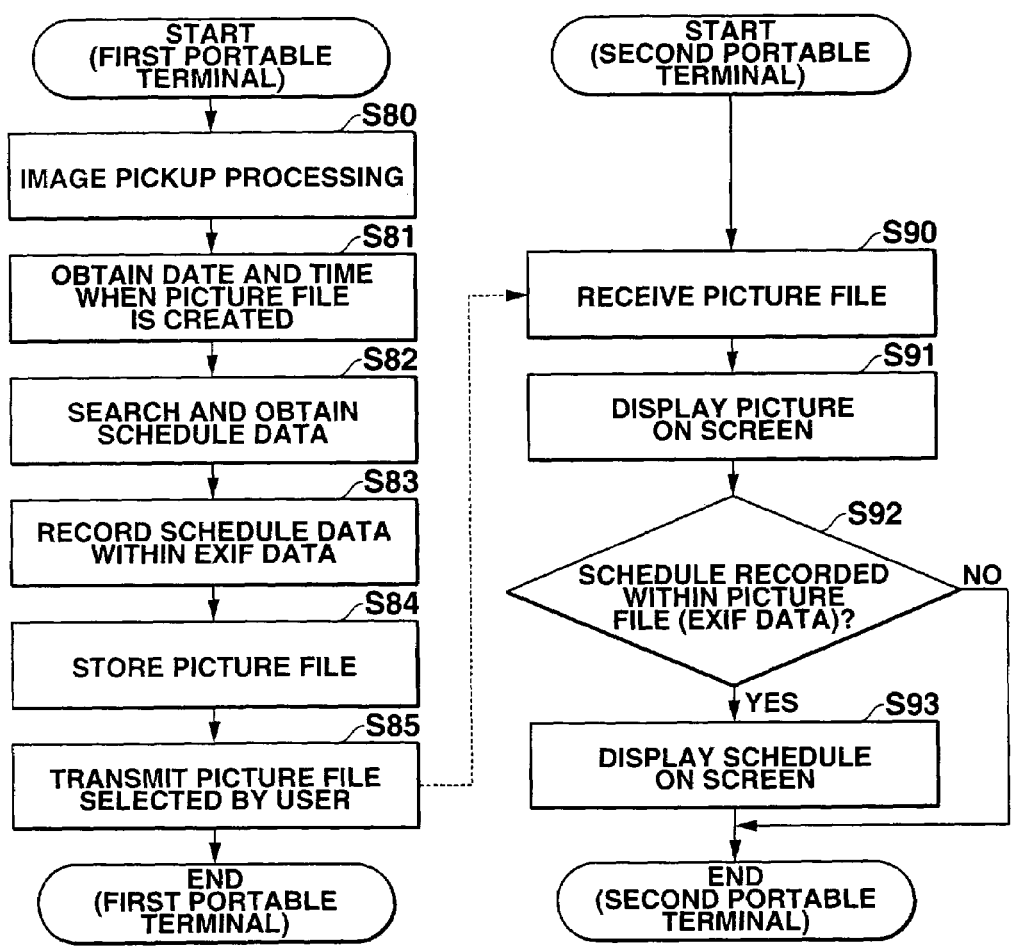
FIG. 11 is a flowchart for describing a processing in accordance with another embodiment example in which a data file storing schedule data is transmitted through communications means, and information thereof is used on another independent terminal.

Hereunder, the contents of a processing indicated in a flowchart in FIG. 11 will be described.

First, the contents of processings to be described below (step S81-S86) are performed by the control section 40 of the first communications terminal 1.

When an image pickup processing by the camera section 10 is performed, and a picture file of a picture picked up is created, the control section 40 temporarily stores the picture file in the temporary storage region 31 (step S80).

After step S80, the control section 40 obtains file creation date and time of the picture file from the clock section 20 (step S81), searches among the schedule data stored in the schedule storage region 32 for schedule data that matches the file creation date and time, and obtains the schedule data that matches the date and time (step S82).

The control section 40 records the schedule data obtained in the stage in step S82 as a "picture title" within EXIF data in the picture file (step S83).

Thereafter, the control section 40 causes the picture file storage region 33 to store the picture file that records the schedule data in its EXIF data (step S84).

Then, when the user selects among the picture files stored in the picture file storage region 33 a picture file to be transmitted to the second communications terminal 2, and inputs a transmission instruction, the control section 40 transmits the picture file to the second communications terminal 2 (step S85).

Next, after the processing (step S85) by the first communications terminal 1 is completed, the contents of processings to be described below (steps S90-S93) are performed by the control section 40 of the second communications terminal 2.

Upon receiving the picture file from the first communications terminal 1 (step S90), the control section 40 displays a picture thereof on the screen (step S91).

Then, the control section 40 judges whether or not schedule data is recorded within EXIF data of the picture file (step S92). When schedule data is not recorded (step S92: No), the processing by the second communications terminal 2 ends. When schedule data is recoded (step S92: Yes), the schedule data is obtained from the EXIF data, and is displayed together with the picture (step S93).

Any of the embodiment examples among the embodiment examples 2 through 5 can be combined with the embodiment example 1. For example, the embodiment example 2 and embodiment example 5 can be combined with the embodiment example 1, or all embodiment examples 2 through 5 can be combined with the embodiment example 1; the embodiment examples can be freely combined. Also, the embodiment example 6 or the embodiment example 7 can be combined with any of the embodiment example 2 through the embodiment example 5. Furthermore, the embodiment example 1 may be selectively used with the embodiment example 6 or the embodiment example 7.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A data file storage device comprising:
   a schedule data storage section that stores schedule data indicating schedule dates and times, titles as well as contents;
   a clock section that clocks the current date and time;
   a file creation date and time acquisition section that obtains from the clock section date and time at which a data file is created;
   a data file storage section that stores plural data files contained in a file folder;
   a file folder creating section that creates a file folder that contains at least a predetermined data file and stores the created file folder in the data file storage section;
   a schedule acquisition section that selects and obtains from among plural pieces of schedule data stored in the schedule data storage section, schedule data having a schedule date and time range matching the date and time range that the predetermined data file was created;
   a folder name setting section that sets a folder name of the file folder that has been created and stored in the data file storage section by the file folder creating section, using a character string derived from a part descriptive of one of the title and the content of the schedule data obtained by the schedule acquisition section; and
   a recording section for recording the schedule data obtained by the schedule acquisition section in EXIF data.

2. A data file storage device according to claim 1, wherein the folder name setting section obtains a designated part of the character string derived from a part that indicates the content of the schedule data obtained by the schedule acquisition section and sets the folder name of the file folder using the obtained designated part of the character string.

3. A data file storage device according to claim 1, further comprising:
   an instruction input request section that requests input of an instruction regarding whether or not to use the character string derived from a part indicating the content of the schedule data obtained by the schedule acquisition section as the folder name of the file folder.

4. A data file storage device according to claim 1, further comprising:
   a selection input request section that requests, when a plurality of schedule data whose dates and times include the file creation date and time are obtained by the schedule acquisition section, a selection input regarding which of the plurality of schedule data be selected, wherein the folder name setting section sets the folder name of the file folder by using schedule data selected and inputted in response to a request from the selection input request section.

5. A data file storage device according to claim 1, further comprising:
   a time difference data acquisition section that obtains time difference data for a designated geographical area; and
   a file creation date and time correction section that corrects the file creation date and time based on the time difference data obtained by the time difference data acquisition section, wherein the schedule acquisition section obtains schedule data based on the file creation date and time of the predetermined data file corrected by the file creation date and time correction section.

6. A data file storage device according to claim 1, wherein the data file storage device is a digital camera with an imaging section, wherein, with respect to a file folder for containing a picture file of a picture picked up by the imaging section as the data file, a folder name is set, using the character string derived from a part descriptive of the content of the schedule data obtained by the schedule acquisition section.

7. A data file storage device according to claim 1, wherein the data file storage device is a portable telephone with an imaging section, wherein, with respect to a file folder for containing a picture file of a picture picked up by the imaging section as the data file, a folder name is set, using the character string derived from a part descriptive of the content of the schedule data obtained by the schedule acquisition section.

8. A data file storage device according to claim 1, wherein the data file storage device is a PDA device with an imaging section, wherein, with respect to a file folder for containing a picture file of a picture picked up by the imaging section as the data file, a folder name is set, using the character string derived from a part descriptive of the content of the schedule data obtained by the schedule acquisition section.

9. A data file storage device according to claim 1, wherein the data file storage section is a file server connected via a network.

10. A data file storage device according to claim 1, wherein the schedule data storage section is a schedule management storage server connected via a network.

11. A data file storage device according to claim 1, wherein the data file storage section stores data files which are created within a period of date and time indicated by the schedule data obtained by the schedule acquisition section, in the file folder whose folder name has been set based on the above schedule data.

12. A data file storage device according to claim 11, further comprising:
    a file name setting section that sets a filename of the data file contained in the file folder, which filename includes the folder name of the file folder.

13. A data file storage device according to claim 12, further comprising:
    a counter value output section that outputs a different counter value every time when a data file is created, wherein the filename setting section sets a filename of the data file based on the counter value output by the counter value output section.

14. A data file storage device according to claim 1, further comprising:
    a filename setting section that sets a filename of the data file contained in the file folder, which filename includes the folder name of the file folder.

15. A data file storage device according to claim 11, wherein the predetermined data file comprises a data file which is created first in the data files which are created within a period of date and time indicated by the schedule data obtained by the schedule acquisition section.

16. A method of storing data files, the method comprising the steps of:
    storing in a schedule data storage section schedule data indicating schedule dates and times as well as contents;

creating a data file;
obtaining date and time that the data file has been created;
creating a file folder for containing at least a predetermined data file;
selecting and obtaining from among plural pieces of schedule data stored in the schedule data storage section, schedule data having a schedule date and time range matching a date and time range that the predetermined data file was created;

setting a folder name of the created file folder, using a character string derived from a part descriptive of the content of the schedule data selected as having the date and time range matching the date and time range that the predetermined data file was created; and recording the schedule data in EXIF data.

* * * * *